(12) United States Patent
Speggiorin

(10) Patent No.: US 7,364,125 B2
(45) Date of Patent: Apr. 29, 2008

(54) SUPPORT FOR APPARATUS IN GENERAL AND, IN PARTICULAR, FOR OPTICAL OR PHOTOGRAPHIC APPARATUS AND THE LIKE

(75) Inventor: Paolo Speggiorin, Mussolente (IT)

(73) Assignee: Lino Manfrotto + Co. S.p.A., Bassano Del Grappa (IT)

( * ) Notice: Subject to any disclaimer, the term of this patent is extended or adjusted under 35 U.S.C. 154(b) by 308 days.

(21) Appl. No.: 10/509,053

(22) PCT Filed: Mar. 28, 2002

(86) PCT No.: PCT/IT02/00202

§ 371 (c)(1),
(2), (4) Date: Sep. 24, 2004

(87) PCT Pub. No.: WO03/083351

PCT Pub. Date: Oct. 9, 2003

(65) Prior Publication Data

US 2005/0151036 A1 Jul. 14, 2005

(51) Int. Cl.
*F16M 11/02* (2006.01)
(52) U.S. Cl. .............................. 248/181.1; 248/182.1; 248/288.31
(58) Field of Classification Search ............. 248/177.1, 248/178.1, 181.1, 181.2, 182.1, 176.1, 288.31
See application file for complete search history.

(56) References Cited

U.S. PATENT DOCUMENTS

| | | | | |
|---|---|---|---|---|
| 1,894,457 A | * | 1/1933 | Zerk | ........................ 248/181.1 |
| 2,168,988 A | | 8/1939 | Hultquist | |
| 3,128,982 A | | 4/1964 | Christopher | |
| 3,632,073 A | * | 1/1972 | Nakatani | ..................... 248/169 |
| 4,121,799 A | * | 10/1978 | Michio | ....................... 248/171 |
| 4,579,436 A | | 4/1986 | Jaumann | |
| 5,341,185 A | * | 8/1994 | Nakatani | ..................... 396/428 |
| 6,820,844 B2 | * | 11/2004 | Tiffen et al. | ............. 248/177.1 |
| 7,047,960 B2 | * | 5/2006 | McCrea | ....................... 124/86 |

FOREIGN PATENT DOCUMENTS

| | | |
|---|---|---|
| DE | 36577 | 8/1886 |
| DE | 39 39 540 A1 | 6/1991 |
| EP | 0 952 383 A2 | 10/1999 |
| FR | 919 481 | 3/1947 |

* cited by examiner

*Primary Examiner*—Korie H. Chan
*Assistant Examiner*—Steven Marsh
(74) *Attorney, Agent, or Firm*—RatnerPrestia

(57) ABSTRACT

A support for apparatus in general and, in particular, for optical or photographic apparatus and the like. The support comprises a pillar arranged to receive the apparatus at a first end and to be housed with its stem in a seat extending through a spider of a tripod. The support also comprises, at the first end, an orientable platform for the levelling of the apparatus independently of the positioning of the tripod, and the pillar is structurally independent of the spider and can be inserted removably in the seat.

21 Claims, 2 Drawing Sheets

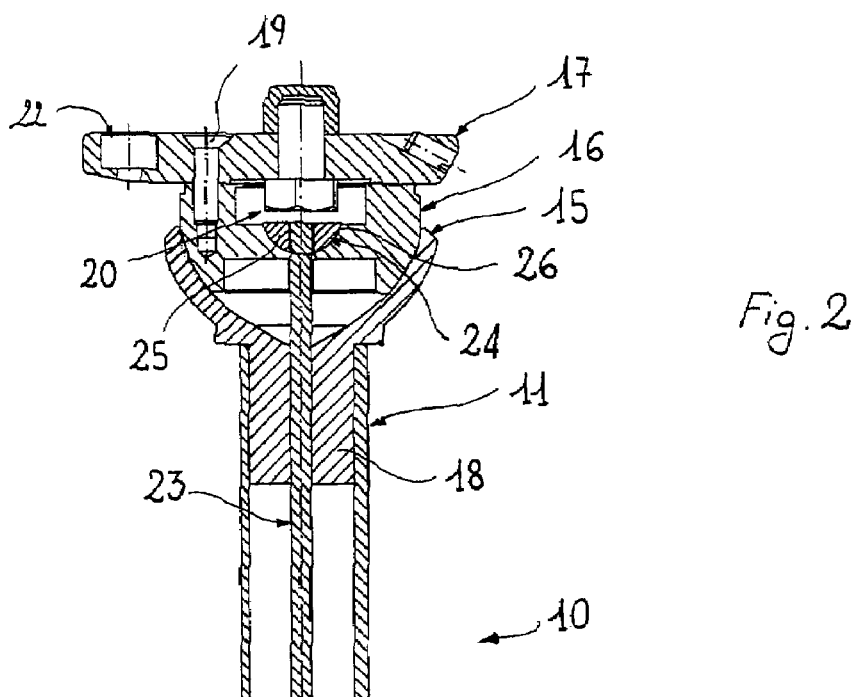
Fig. 2
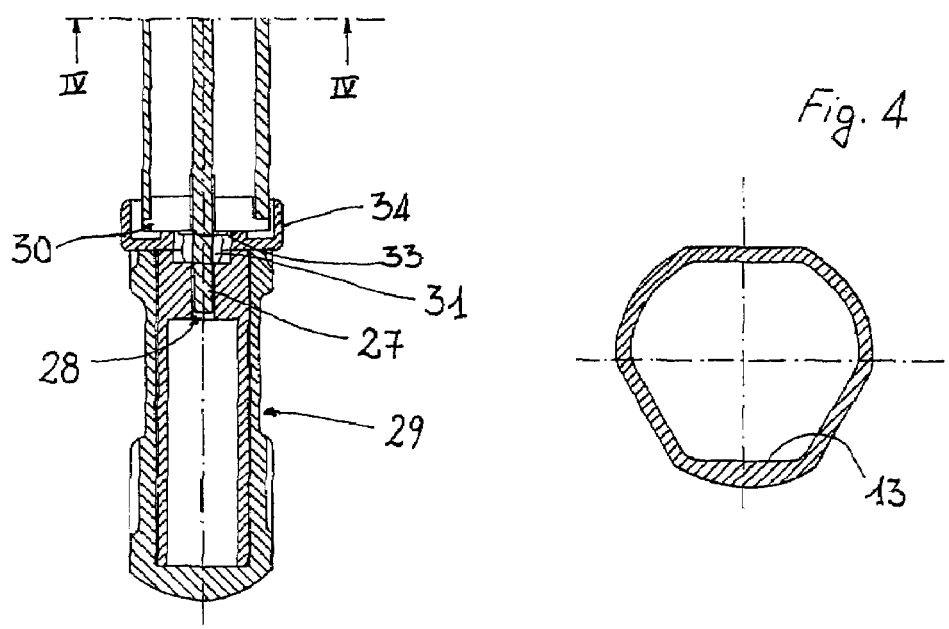
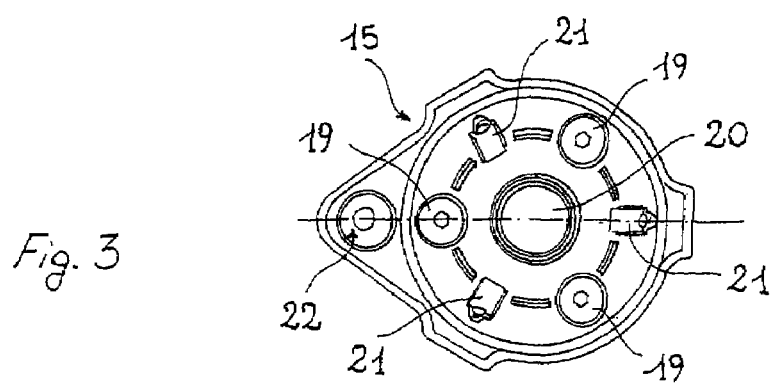
Fig. 4
Fig. 3

SUPPORT FOR APPARATUS IN GENERAL AND, IN PARTICULAR, FOR OPTICAL OR PHOTOGRAPHIC APPARATUS AND THE LIKE

TECHNICAL FIELD

The subject of the present invention is a support for apparatus in general and, in particular, for optical or photographic apparatus and the like.

TECHNOLOGICAL BACKGROUND

Supports including the above-mentioned characteristics are used widely in the photographic and cinematographic fields, generally in association with tripods or stands for the orientable support of cameras. In this field, a need arises to position the stand or tripod with a pillar support mounted thereon and to be able to orient the apparatus mounted on the support about its own axis. This need arises typically to achieve panoramic shots.

In this situation, it is necessary to position the tripod with care so that the rotation of the pillar takes place while the desired level state of the camera is maintained.

Cinematographic tripods and stands are also known, in which, to avoid the need for a level position, supports are used which have orientable platforms on which the head that supports the optical or photographic apparatus is mounted in turn. However, these supports require rack drives which interfere with the freedom of positioning of the pillar. Moreover, they are wholly unsuitable for applications in which the pillar can be moved to two or more positions on the tripod.

Supports for apparatus having conventional features are disclosed in U.S. Pat. No. 3,128,982 and in U.S. Pat. No. 2,168,988.

SUMMARY OF THE INVENTION

The main aim of the invention is to provide a support which can be mounted on tripods of conventional design and which at the same time affords all of the advantages typical of tripods with orientable platforms.

Within the scope of this aim, an important object of the invention is to provide a support which has safety devices for protecting the integrity of the apparatus that can be mounted on it.

Another object of the invention is to provide an easily adjustable support.

One of the chief objects of the invention is to provide a support which is designed structurally and functionally to overcome all of the disadvantages discussed with reference to the prior art mentioned.

This aim, and these and further objects, are achieved by a support formed in accordance with the present invention as described and illustrated.

BRIEF DESCRIPTION OF THE DRAWINGS

The characteristics and the advantages of the invention will become clearer from the detailed description of a preferred embodiment thereof, described by way of non-limiting example, with reference to the appended drawings, in which:

FIG. 2 is a view of the support of FIG. 1 in longitudinal section;

FIG. 3 is a plan view of the support of FIG. 1; and

FIG. 4 is a section through the support, taken along the line IV-IV of FIG. 1.

PREFERRED EMBODIMENT OF THE INVENTION

Figure 1:
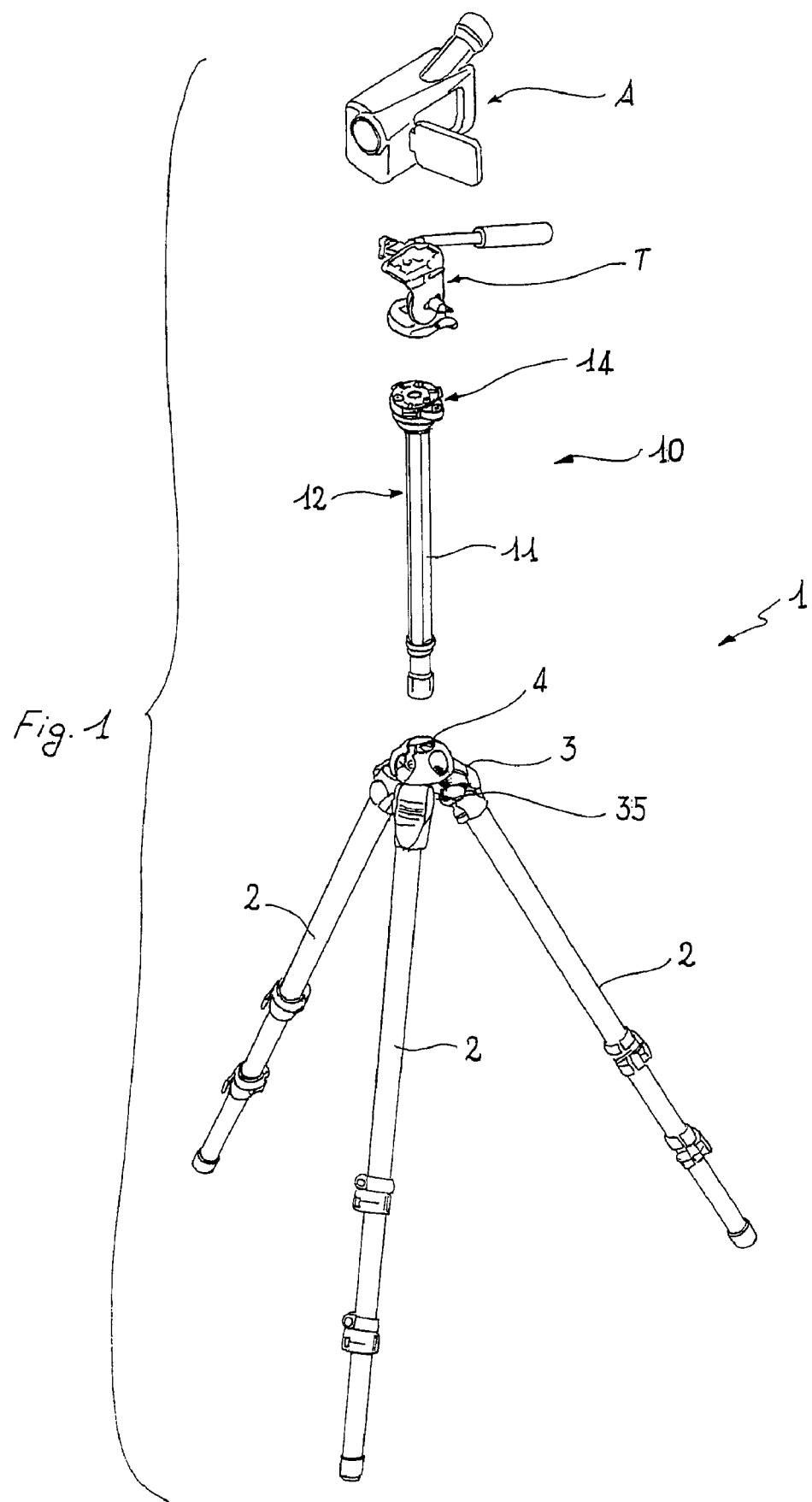
FIG. 1 is a perspective view of a tripod including a support according to the invention, with parts separated.

In the drawings, a tripod for photographic and/or cinematographic uses, generally indicated 1, has legs 2 all of which converge in a spider 3 through which two seats, both indicated 4, extend; the stem 11 of a pillar 12, forming part of a support, formed in accordance with the invention and generally indicated 10, is housed alternatively in one or the other of the seats 4.

The stem 11 has a three-lobed, tubular configuration with an approximately triangular, equilateral shape with rounded angles. One of the angles has a wall thickening 13 (see FIG. 4) which enables the stem 11 to be machined if necessary to produce an optional rack within the thickness of the thickening 13.

The support 10 comprises, at a first end of the stem 11, an orientable platform 14 including a first ball and socket joint with a socket 15 and a ball 16 fixed firmly to the pillar 12 and to a fixing plate 17 of the platform 14, respectively. The socket 15 is fixed to the pillar 12 by a shank 18 of the socket 15, which is housed and clamped in the stem 11. The ball 16 is fixed to the fixing plate 17 by screws 19. The plate 17 also carries fixing mechanisms 20, 21 for a head T which is orientable about two or more axes, and a level mechanism 22. The fixing mechanism 20 comprises a screw for clamping the head against the plate 17. The fixing mechanism 21 comprises a plurality of grub screws converging towards the axis of the screw and arranged to preload the fixing mechanism 20 between the fixing plate 17 and the head T of the apparatus A fixed thereto. Accidental slackening of the fixing mechanism 20 is thus prevented.

The grub screws of the fixing mechanism 21 are inclined to the axis of the fixing mechanism 20 so as to be accessible even though they are close to the ball 16 and the overall size of the fixing plate 17 is small.

The ball 16 is clamped in the socket 15 in order to lock the first ball and socket joint through a tie rod 23 extending axially through the pillar 12 and restrained on the ball 16 by a second ball and socket joint 24 including a ball 25 fixed to the end of the tie rod 23 and a spherical seat 26 formed in the ball 16 of the first joint.

At its end remote from the ball 25, the tie rod 23 has a threaded shank 27 which is engaged by screwing in a female thread 28 formed in a knob 29. The rotation of the knob 29 in the two senses causes the tie rod 23 to tighten or slacken, respectively. A plug 30 is inserted in the end of the stem 11 corresponding to the knob 29 and a self-locking nut 31 is screwed onto the threaded shank 27 to abut the plug 30, with the interposition of a Belleville washer 33. A friction load is thus provided in the first and second ball and socket joints, independently of the slackening or removal of the knob 29 from the shank 27, that is, when the tie rod 23 is slackened, so as to secure the photographic apparatus A mounted on the orientable platform against abrupt oscillations and impacts resulting from such slackening.

A small plate 34 interposed between the knob 29 and the pillar 12, is fixed firmly to the knob 29 and projects radially therefrom to interfere with the spider 3, to prevent the pillar 12 accidentally slipping out of the seat 4.

The sliding of the pillar 12 in the seat 4 can be stopped in an adjustable position by a brake 35, for example, of the type with a screw-operated block mounted on the spider 3 and operable by a hand wheel, or by the devices provided for in the Applicant's Italian patent application No. PD98A000096, and also as shown in U.S. Pat. No. 6,164,843.

In order to clamp the orientable head T, for example, a panoramic head, on the support 10, or to clamp an optical, photographic, or cinematographic apparatus A such as a video camera directly on the support 10, the apparatus A is positioned on the fixing plate 17 and is fixed thereon as indicated, by the mechanisms 20, 21. The orientable platform is then levelled by slackening the knob 29, and with it the tie rod 23, as much as necessary in order to pivot the socket and ball 15, 16 of the first ball and socket joint relative to one another. Should the tie rod 23 be slackened too much, the maintenance of a friction preloading by the nut 31 and by the Belleville washer 33 prevents sudden pivoting of the orientable platform and consequent damage to the apparatus A supported thereon. Upon completion of the desired levelling, which can be achieved by virtue of the level mechanism 22, the knob 29 is tightened in order to lock the first ball and socket joint in the position reached.

It is pointed out that, by virtue of the shape of the stem 11 and of the seat 4, which provide for a non-rotatable, guided coupling of the pillar 12 in the spider 3, the levelling of the orientable platform is maintained, even if the height position of the support 10 relative to the tripod 1 is varied.

The desired height adjustment is thus performed with the knowledge that the levelling achieved will be maintained for any subsequent rotation of the apparatus A by its support head T.

In order to remove the support 10 from the tripod 1, it suffices to slacken the knob 29 completely until it is removed from the threaded shank 27 of the tie rod 23, together with the small plate 34, and then to release the block brake 35 disposed in the spider 3.

The invention thus achieves the aim proposed and affords many advantages over conventional supports. By producing the support in a form such that it is removable from the tripod, the tripod can be used in different combinations and in different positions.

Moreover, the prevention of relative rotation between the pillar and the spider achieves the advantage mentioned above, that the levelling of the platform is maintained irrespective of the movement of the pillar relative to the spider.

The provision of a friction load on the first ball and socket joint constitutes a precautionary measure for protecting the support and whatever is mounted on it.

The provision of thickenings in the stem permits optional machining thereof for a rack drive.

The invention claimed is:

1. A support for apparatus including a tripod having a spider with a seat extending through the spider, the support comprising:
    a pillar having a stem and being arranged to receive the apparatus at a first end and to be housed with its stem in the seat extending through the spider of the tripod, the pillar being structurally independent of the spider and capable of being inserted removably in the seat and being slidable therein; and
    an orientable platform located at the first end of the pillar for the levelling of the apparatus independently of the positioning of the tripod, the orientable platform having a first ball and socket joint including a ball fixed firmly to a fixing plate of the platform and a socket fixed firmly to the stem of the pillar, and a tie rod acting between the socket and the ball in order, when tensioned, to prevent relative rotation thereof, the tie rod extending through the stem of the pillar and being operated by a knob associated with a second end of the pillar remote from the first end.

2. A support for apparatus including a tripod having a spider with a seat extending through the spider, the support comprising:
    a pillar having a stem and being arranged to receive the apparatus at a first end and to be housed with its stem in the seat extending through the spider of the tripod, the pillar being structurally independent of the spider and capable of being inserted removably in the seat and being slidable therein; and
    an orientable platform located at the first end of the pillar for the levelling of the apparatus independently of the positioning of the tripod, the orientable platform having a first ball and socket joint including a ball fixed firmly to the system of the pillar and a socket fixed firmly to a fixing plate of the platform, and a tie rod acting between the socket and the ball in order, when tensioned, to prevent relative rotation thereof, the tie rod extending through the stem of the pillar and being operated by a knob associated with a second end of the pillar, remote from the first end.

3. The support according to claim 1 or claim wherein a fixing mechanism for a head for the orientable support of the apparatus is associated with the plate.

4. The support according to claim 3 in which the fixing mechanism comprises at least one screw coupling which can clamp the head or apparatus against the fixing plate and at least one grub screw which can preload the fixing mechanism between the plate and the head or apparatus.

5. The support according to claim 1 or claim 2 in which the knob is screwed onto the tie rod by operative actuation of the knob.

6. The support according to claim 5 in which the knob is associated removably with the tie rod in order to be removed for the purpose of the removal of the pillar from the seat in the spider and its insertion therein.

7. The support according to claim 1 or claim 2 further comprising a small plate, removable with the knob, interposed between the knob and the pillar and projecting radially from the pillar in order to prevent the pillar from accidentally slipping out of the seat.

8. The support according to claim 7 in which the small plate is fixed firmly to the female thread of the knob.

9. The support according to claim 1 or claim 2 further comprising preloading means provided on the tie rod for ensuring a friction load in the first ball and socket joint when the tie rod is slackened.

10. The support according to claim 1 or claim 2 in which locking means is provided between the spider and the pillar for locking the pillar in the seat, in an adjustable position along the stem.

11. The support according to claim 10 in which the locking means comprises a brake mounted in the spider.

12. The support according to claim 10 in which the shape of the stem of the pillar and of the seat in the spider is such as to provide a non-rotatable guided coupling of the pillar in the spider.

13. A support for apparatus, the support comprising:
    a tripod having a spider with a seat extending through the spider;

a pillar having a stem and being arranged to receive the apparatus at a first end and to be housed with its stem in the seat extending through the spider of the tripod, the pillar being structurally independent of the spider and capable of being inserted removably in the seat and being slidable therein;

an orientable platform located at the first end of the pillar for the levelling of the apparatus independently of the positioning of the tripod, the orientable platform having a first ball and socket joint including a ball and a socket fixed firmly to a fixing plate of the platform and to the stem of the pillar, respectively, or vice versa, and a tie rod acting between the socket and the ball in order, when tensioned, to prevent relative rotation thereof, the tie rod extending through the stem of the pillar and being operated by a knob associated with a second end of the pillar remote from the first end;

a level mechanism associated with the plate;

a fixing mechanism for a head for the orientable support of the apparatus associated with the plate;

a small plate, removable with the knob, interposed between the knob and the pillar and projecting radially from the pillar in order to prevent the pillar from accidentally slipping out of the seat; and preloading means provided on the tie rod for ensuring a friction load in the first ball and socket joint when the tie rod is slackened.

14. The support according to claim 13 in which the fixing mechanism comprises at least one screw coupling which can clamp the head or apparatus against the fixing plate and at least one grub screw which can preload the fixing mechanism between the plate and the head or apparatus.

15. The support according to claim 1 or claim 2 in which the knob is screwed onto the tie rod by operative actuation of the knob.

16. The support according to claim 15 in which the knob is associated removably with the tie rod in order to be removed for the purpose of the removal of the pillar from the seat in the spider and its insertion therein.

17. The support according to claim 16 in which the small plate is fixed firmly to the female thread of the knob.

18. The support according to claim 13 further comprising locking means provided between the spider and the pillar for locking the pillar in the seat, in an adjustable position along the stem.

19. The support according to claim 18 in which the locking means comprises a brake mounted in the spider.

20. The support according to claim 18 in which the shape of the stem of the pillar and of the seat in the spider is such as to provide a non-rotatable guided coupling of the pillar in the spider.

21. The support according to claim 1 or claim 2 further compromising a level mechanism associated with the plate.

* * * * *